United States Patent [19]

Köhler

[11] 4,245,726
[45] Jan. 20, 1981

[54] SUPPLY SYSTEMS FOR MOBILE APPLIANCES, PARTICULARLY MINING MACHINES

[75] Inventor: Dieter Köhler, Ahlen, Fed. Rep. of Germany

[73] Assignee: Gewerkschaft Eisenhütte Westfalia, Lünen, Fed. Rep. of Germany

[21] Appl. No.: 13,903

[22] Filed: Feb. 22, 1979

[30] Foreign Application Priority Data

Nov. 25, 1978 [DE] Fed. Rep. of Germany ....... 2808240

[51] Int. Cl.³ ............................................. B60M 1/34
[52] U.S. Cl. ................................... 191/23 A; 191/25; 191/48; 339/22 T
[58] Field of Search .................. 191/23 A, 25, 31, 48; 339/21 R, 21 S, 22 R, 22 T

[56] References Cited

U.S. PATENT DOCUMENTS 448,838  3/1891  Pocock .................................. 191/25

FOREIGN PATENT DOCUMENTS 13943 of 1891 United Kingdom ...................... 191/25

Primary Examiner—Richard A. Schacher
Attorney, Agent, or Firm—Charles E. Pfund

[57] ABSTRACT

A duct section serves as part of a supply system for supplying electric power or a pressure medium to a mobile appliance and especially to a mining machine in a mine working where protection against explosion or fire is necessary. The duct section has a wall with a longitudinal slot therein and pick-up engages in the slot to collect the electric current or pressure medium. The slot is sealed with the aid of thin flexible sealing strips held flat against the inner and outer surfaces of the slotted wall. The pick-up is shaped to progressively deflect the strips away from the slotted wall to permit the passage of the pick-up and maintains the interior sealing with the aid of further seals slidable engaging with the slotted wall over the region where the strips are deflected.

19 Claims, 5 Drawing Figures

SUPPLY SYSTEMS FOR MOBILE APPLIANCES, PARTICULARLY MINING MACHINES

BACKGROUND TO THE INVENTION

The present invention relates in general to the supply of a service or utility, more usually electric power or pressure medium, to a mobile appliance or machine and especially to a mobile appliance in an underground mine working.

It is known to supply electric power to an appliance, such as a locomotive or a mineral winning machine, with the aid of an electric track composed of hollow conduits or duct sections containing electric live rails and to utilize a collector or pick-up which engages through slots in the conduits to contact the live rails. Such arrangements are described, for example, in German Pat. Nos. 1515340, 2522319, 2522320 and 2522321. In order to seal off the slots in the conduits or duct sections of the prior art arrangements, elastic seals are used which engage on one another and which are pressed apart locally by the passage of the collector or pick-up. In one known form of seal, hoses are expanded by gas pressure to engage on one another. It is also known from the prior art, to introduce a protective gas under pressure in the conduits or duct sections to ensure no explosive or combustible gas can enter the duct sections. Problems can occur with the seals hitherto adopted or proposed. The hose type seal is, for example, prone to leakage of its expanding gas when it has encountered a certain amount of wear. Once the hoses begin to leak the sealing of the duct section slots fails. Also, in the prior art arrangement, the duct-sections are not reliably maintained in a sealed condition in the region of the pick-up or collector and hence protective gas must be supplied to the duct sections in relatively large quantities to supplement the loss caused by the passage of the pick-up.

A general objection of the present invention is to provide an improved construction of the aforementioned kind especially regards the sealing of the duct-section access slot.

SUMMARY OF THE INVENTION

In accordance with the invention, the slot of a duct section containing a utility or service, such as electricity or pressure medium, and through which displaceable pick-up or collector means gains access to pick up the service or utility for supply to a mobile appliance is sealed with at least one flat seal which covers over the slot and is locally deflected away from the slot by the passage of the pick-up means. It is preferable to adopt two flat seals, one engaging on the inner surface of the duct section to cover the slot and the other engaging on the outer surface of the duct section to cover the slot, thereby to cover the length and width of the slot from the inside and outside. The outer seal is particularly effective at preventing dust and extraneous matter from entering the duct section. The adoption of flat seals is considerably simpler than the prior art seals and leads to better results. The flat seals can be made of wear-resilient metal, e.g., thin resilient steel strips or synthetic plastics capable of coping with the harsh operating conditions encountered in underground mine workings. If the duct section is provided with protective gas under pressure the inner seal can be held in face-to-face contact with the inner surface of a slotted wall of the duct section by the gas pressure. However, where the strip seals are metallic and/or magnetizable, the provision of one or more magnets can hold the strip seals in the sealing position unless displaced by the pick-up means.

The pick-up means can take a variety of forms but in one preferred arrangement a body locates within the duct section and extends partly around the inner flat seal which is deflected into a cavity of the body as the pick-up means progresses along the slot of the duct section. To maintain the sealing effect locally of the body where the inner flat seal is deflected, the body itself carries additional seals which slidably engage on the inner surface of the slotted wall. The pick-up means may additionally comprise a slide member engaging in the slot and adopting a wedge-like profile to gently and progressively deflect the flat seals away from the slotted wall. The slide member is connected to the inner body and also to an outer body serving as a mounting piece located outside the duct-section. The mounting piece may also have a cavity into which the outermost flat seal is deflected and this component also may have additional seals which similarly slidably engage on the outer surface of the slotted wall to supplement the sealing effect. Means is preferably provided in the duct section to urge the inner body towards the inner surface of the duct section so its seals are pressed against this inner surface. It is also useful to provide rollers on the mounting piece and the inner body to engage on the flat seals to hold these in sealing engagement with the slotted wall in the region at the front of the pick-up means relative to its direction of movement just prior to the deflection thereof and to return the flat seals back into sealing engagement with the slotted wall on the region at the rear of the pick-up means after the deflection thereof.

A duct section and pick-up means constructed in accordance with the invention are especially useful as part of an electric supply. In this case, a number of duct sections can be joined end-to-end and they contain a common conductor, i.e., a live rail or bus bar with which electrical contacts of the pick-up means engage. The pick up means can then supply electric current to a locomotive, a winning machine or some other appliance in a mine working. To supply the protective gas to the interior of the duct sections the pick-up means can carry a conduit leading to the interiors of the duct sections. The sealing means according to the invention ensures that only slight leakage losses have to be made up by the conduit.

A duct section and pick-up means constructed in accordance with the invention can also be used to supply a pneumatic or hydraulic pressure medium to an appliance in a mine working and again the sealing means ensures only slight leakage losses. One possible use for this arrangement would be to supply water to the spray nozzles of a winning machine, such as a shearer or plough.

The invention may be understood more readily and various other features of the invention may become apparent from consideration of the following description.

BRIEF DESCRIPTION OF DRAWING

An embodiment of the invention will now be described, by way of example only, with reference to the accompanying drawings, wherein.

DESCRIPTION OF PREFERRED EMBODIMENT

Figure 1:
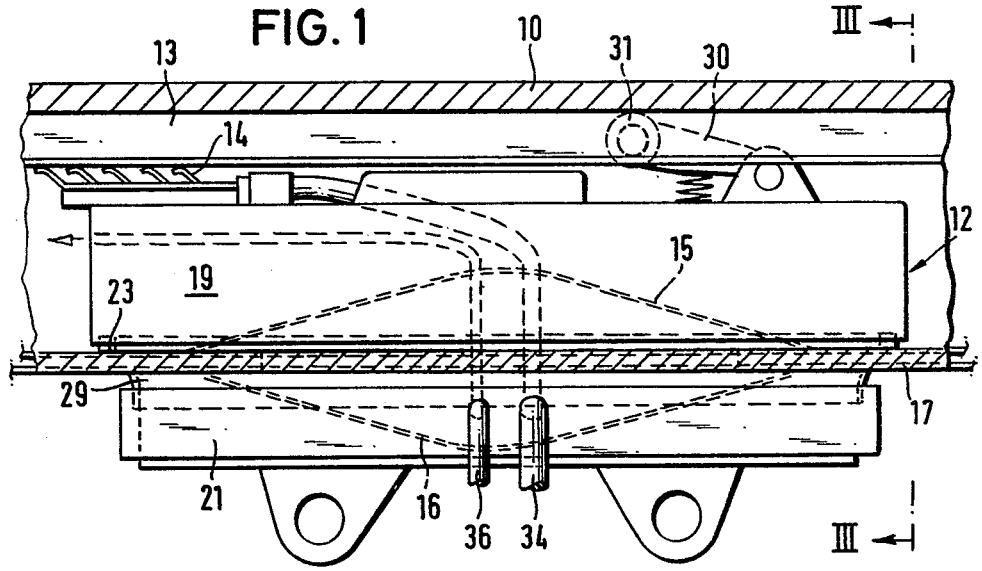
FIG. 1 is a longitudinal sectional side view of part of an electrical supply means constructed in accordance with the invention, the view being taken along the line I—I of FIG. 3.

Electrical supply means adapted for use in environments where there is a danger of explosion or fire, and especially in underground mine workings, is composed of a plurality of duct sections joined end-to-end in flexible or rigid manner. The accompanying drawings depict part of one of these duct sections together with electric pick-up means with which it is associated. As shown in the drawings the duct section 10 takes the form of a hollow box-like casing provided with an access slot 11 in one wall 17. An electric live rail or bus bar 13 is mounted within the duct section 10 and electric connection is made between the rails 13 of adjacent duct sections 10. Electric pick-up means 12 moves along the successive duct sections 10 and conveys electric current from the rails 13 via an electric cable 34 to some movable appliance, such as a mineral winning machine, (not shown) which would normally carry the pick-up means 12. Electrical connection is established between the cable 34 of the pick-up means 12 and the electric rails 13 by way of sliding contacts 14.

The slot 11 which is provided in the wall 17 of the casing of the duct section is sealed with the aid of separate seals 15,16. The seals 15,16 take the form of thin, resilient, wear-resistant steel strips having a width somewhat greater than the slot 11. The seal 15 is located inside the casing and engages on the inside surface of the wall 17 to cover the width and length of the slot 11 interiorly. Conversely, the seal 16 engages on the outside surface of the wall 17 to cover the width and length of the slot 11 exteriorly. Both seals 15,16 are held in sealing engagement with the wall 17 by means of permanent magnets 18 located on the edges of the slot 11. The pick up means 12 is adapted to deflect and lift the seals 15,16 away from the slot 11 locally as the pick up means progresses along the duct section in question to permit access to the rail 11. The pick-up means 12 employs, inter alia, a shaped member or slide piece 20 which engages in the slots 11 to run along the duct sections. The slide piece 20 is depicted separately in FIG. 5 and as shown, it has a generally H-shaped cross-section with a first portion located within the casing of the duct section and a second portion located outside the casing. An inner body or shoe 19 locates inside the casing of the duct section and is fixed to the first portion of the slide piece 20 and similarly an outer body or mounting piece 21 is fixed to the second portion of the slide piece 20 outside the casing. The shoe 19 is shaped to extend partly around the seal 15, and to this end the shoe 19 has a cavity or recess 22 facing the slot 11 into which the seal 15 can be deflected as the pick-up means 12 passes. At the side facing the inner surface of the wall 17, the shoe 19 carries seals 23 in the form of resilient strips maintained in contact with the inner surface of the wall 17, conveniently by means of spring-pressure. The seals 23 complement the sealing action of the strip seal 15 and maintain the cavity 22 sealed in respect of the interior of the casing outside the shoe 19. Likewise, the external mounting piece 21 is shaped to extend partly around the seal 16 and the mounting piece 21 has a cavity or recess 28 facing the slot 11 into which the seal 16 is deflected as the pick-up means 12 moves along the duct section. At the side facing the outer surface of the wall 17, the mounting piece 21 carries seals 29 in the form of resilient elastic strips maintained in contact with the outer surface of the wall 17. The seals 29 again complement the sealing action of the strip seal 16 and maintain the cavity 28 sealed in respect of the surroundings outside the mounting piece 21.

Figure 3:
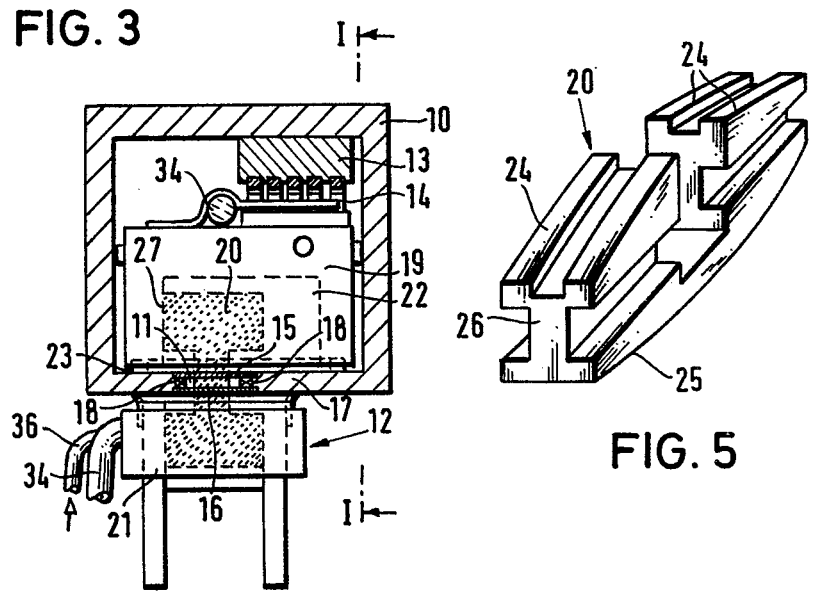
FIG. 3 is a cross-sectional end view of the part of the electrical supply means depicted in FIG. 1, the view being taken along the line III—III of FIG. 1.
Figure 5:
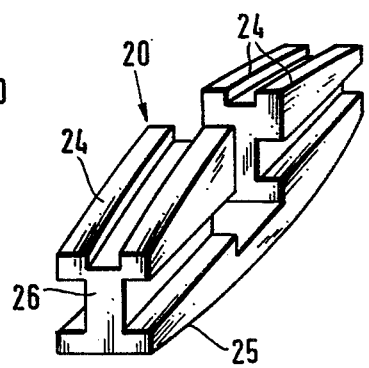
FIG. 5 is a perspective view of a component of the electrical supply means.
Figure 2:
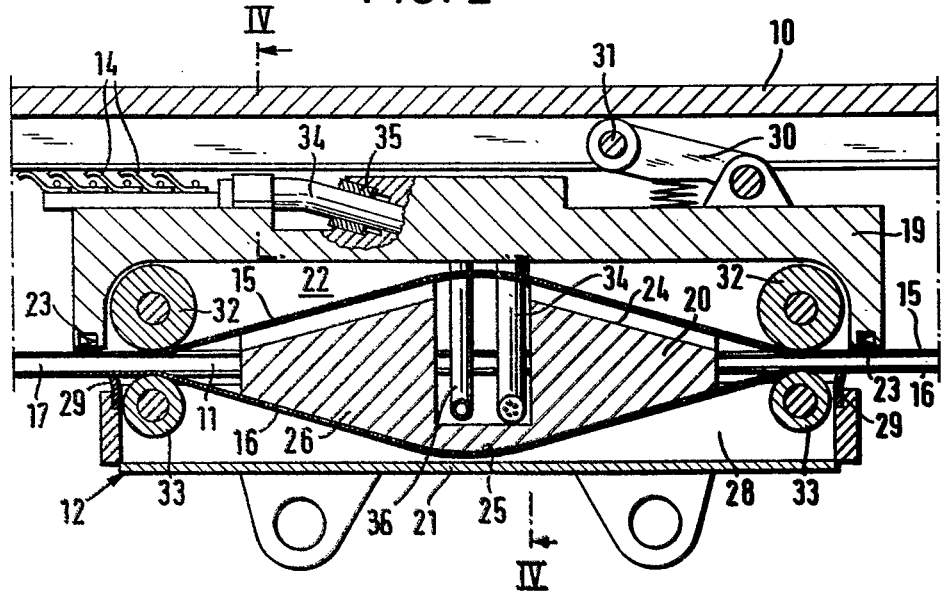
FIG. 2 is a longitudinal sectional side view of the part of the electrical supply means depicted in FIG. 1, the view being taken along the line II—II of FIG. 4.
Figure 4:
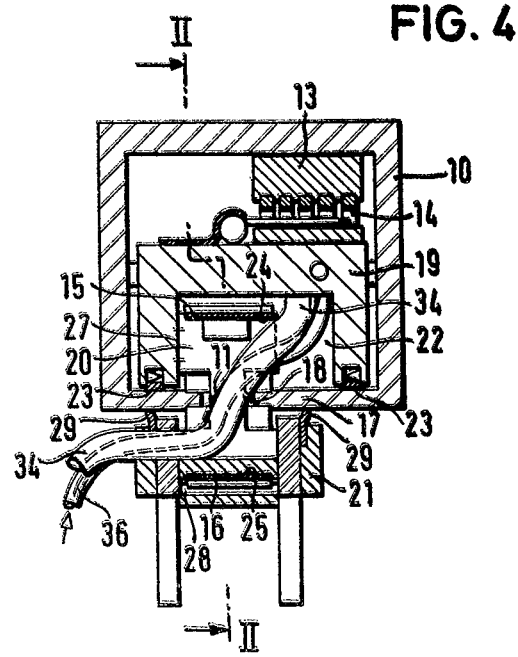
FIG. 4 is a cross-sectional view of the part of the electrical supply means depicted in FIG. 1, the view being taken along the line IV—IV of FIG. 2.

As shown in FIG. 5, the slide piece 20 has a central recess and tapered upper and lower surfaces 24,25, forming wedges, converging towards the outer ends of the slide piece 20. As shown in FIGS. 2 and 3, the first portion of the slide piece 20 (i.e. the upper portion of FIG. 5) engages inside the cavity 22 of the shoe 19 while the second portion of the slide piece 20 (i.e. the lower portion of FIG. 5) engages inside the cavity 28 of the mounting piece 21. The first portion of the slide piece 20 is laterally offset in relation to the cavity 22 and is secured at one side to the shoe 19 as indicated by reference numeral 27. The narrow central bridge region 25 of the slide piece 20 which interconnects the first and second portions thereof locates in the slot 11. The tapered surfaces, 24,25 of the slide piece 20 serve to smoothly and progressively deflect the strip seals 15,16 into the respective cavities 22,28 of the shoe 19 and the mounting piece 21, as shown in FIGS. 1, 2 and 4. The seals 23,29 however maintain the interior of the casing sealed in respect of the exterior. The shoe 19 is also provided with a device 30 which serves to bias the shoe 19 into sliding contact with the inner surface of the wall 17. As shown in FIG. 1, the device 30 takes the form of a lever supporting a roller 31 and a spring which acts on the lever to urge the roller 31 into rolling engagement with the inner surface of the upper wall of the casing opposite the slotted wall 17. Further rollers 32,33 are mounted at the ends of the cavities 22,28 of the shoe 19 and the mounting piece 21 to engage on the strip seals 15,16 to urge the seals 15,16 against the wall 17 inwardly of the seals 23,29. The rollers 32,33 thus act to hold the seals 15,16 just prior to their deflection by the slide piece 20 and to return the seals 15,16 after this deflection.

The electric cable 34 extends from the exterior laterally of the mounting piece 21 to enter the cavity 28 and thence passes through the central recess of the sliding piece 20 to enter the recess 22 in the shoe 19. From there, the cable 24 is led into the interior of the casing for connection with the contacts 14. The entry of the cable 34 to the cavities 22,28 is established without affecting the sealing thereof and for this purpose cable seals 35 (FIG. 2) can be provided. A conduit 36 is also mounted to the pick-up means 12 to supply a protective gas, e.g., nitrogen, to the interior of the casing. The conduit 36 is conducted into the interior of the casing in a similar manner to the cable 34. The protective gas can be supplied from a vessel carried by the mobile machine or appliance. The protective gas in the casing is above atmospheric pressure and since the interior of the casing is sealed from the exterior, it is only necessary to supply make-up gas to supplement any small leakage losses. In the event of more serious leakage, the protective gas flows from the interior of the casing to the exterior and due to the pressure differential, no explosive gas can enter the casing from the outside. Nevertheless, it is expedient to have additional devices which would disable the electric supply to the rails 13 should adverse conditions become established. Instead of employing thin metal strips as the seals 15,16 it is possible to use other materials. For example, the seals 15,16 can be made from wear-resistant reinforced synthetic plastics. Such a plastics strip seal can be impregnated with magnetic particles so that the magnets 18 can still be used to hold the strip seals in sealing engagement with the wall 17. Instead of using magnets 18, however, the seals 15,16 can be held against the wall 17 by means of other devices such as springs. Since the seal 15 can be effectively urged against the inner surface of the wall 17 by the pressure of the protective gas and since the inherent resilience of certain materials can act to hold the seals 15,16 against the wall 17, it is feasible to employ a construction wherein there are no special measures taken to urge the seals 15,16 against the wall 17. It is possible also to adapt the invention to the supply of hydraulic or pneumatic pressure medium. In this case the pressure medium is supplied to the interior of the duct sections and the electric pick-up means takes the form of a collector for the pressure medium. The rails 13 and the contacts 14 and the cables 34 are, of course, omitted. Otherwise, the duct sections with their seals 15,16 can take the form as described and/or illustrated with the shoe 19, the slide piece 20 and the mounting piece 21 serving as the carrier of the pressure medium collector and overall serving as collector means for the pressure medium.

I claim:

1. The combination of an elongate duct section containing a service or utility for a mobile appliance and displaceable pick-up means for picking up the service or utility from the duct section for supply to the appliance; wherein the duct section has a longitudinal slot and sealing means for sealing off the interior of the duct section from the exterior, said sealing means including two flat seals, one engaging on an interior surface of the duct section to cover the slot interiorly and the other engaging on an exterior surface of the duct section to cover the slot exteriorly and wherein the pick-up means extends at least partly through the slot and locally deflects the flat seals away from the slot while the sealing is maintained.

2. The combination according to claim 1, wherein each flat seal is a thin metal strip.

3. The combination according to claim 1, wherein each flat seal is a thin synthetic plastics strip.

4. The combination according to claim 1, wherein each flat seal is magnetizable and magnetic means serves to hold the seals in sealing abutment with said duct section surfaces.

5. The combination according to claim 1, wherein the duct section has a wall in which the slot is provided.

6. The combination according to claim 1 and further comprising means for holding the flat seals in sealing engagement with the associated surfaces of the duct section except where the seal is locally deflected by the passage of the pick-up means.

7. The combination according to claim 1, wherein the pick up means comprises a slide member engaging in the slot to deflect both seals from the respective duct section surfaces as it progresses along the slot and an inner body located in the duct section and connected to the slide member, the inner body having a cavity therein into which the inner flat seal is deflected by the passage of the slide member.

8. The combination according to claim 7, wherein the inner body is provided with seals complementary to the inner flat seal and slidably and sealably engaging with the inner surface of the duct section to maintain the sealing where the inner flat seal is deflected.

9. The combination according to claim 1, wherein the pick-up means is provided with seals complementary to the flat seals and slidably and sealably engaging with the duct section to maintain the sealing where the flat seals are deflected.

10. The combination according to claim 1, wherein the pick-up means at least includes a slide member which projects through the slot in the duct section and which is shaped to engage and progressively deflect both flat seals away from the respective surfaces of the duct section over a region locally of the slide member as the latter moves along the slot.

11. The combination according to claim 10, wherein the pick-up means further comprises an inner body located within the duct section and connected to the slide piece, the inner body having a cavity into which the inner flat seal is deflected by the passage of the slide piece, an outer body located outside the duct section and connected to the slide piece, the outer body having a cavity into which the outer flat seal is deflected by the passage of the slide piece, seals on inner and outer bodies complementary to the flat seals, the seals on the inner body slidably and sealably engaging with the inner surface of the duct section and the seals on the outer body slidably and sealably engaging with the outer surfaces of the duct section to thereby maintain the sealing where the flat seals are deflected.

12. The combination according to claim 7 and further comprising means for urging the inner body towards the inner surface of the duct section.

13. The combination according to claim 10 and further comprising rollers on the inner and outer bodies which rollers engage on the flat seals to press these seals against the duct section surfaces before and after the passage of the slide member and their consequential deflection.

14. The combination according to claim 1, wherein the duct section contains an electrical conductor and the pick-up means makes electrical contact with said conductor and wherein the pick-up means carries a conduit through which a protective gas under pressure can be supplied to the interior of the duct section.

15. In a duct section for the supply of electricity to a mobile appliance; said duct section containing an electrical conductor and having a slot through which displaceable electrical pick-up can gain access to the interior of the duct section and the electrical conductor and sealing means for sealing the slot; the improvement comprising the sealing means employs two flat seals, one of which engages on an interior surface of the duct section to cover the slot interiorly and the other of which engages on an exterior surface of the duct section to cover the slot exteriorly and the seals are displaced from their associated surfaces by the passage of the pick-up means.

16. A duct section according to claim 15, and further comprising means for holding the flat seals in sealing engagement with the duct section except where the seals are locally displaced by the passage of the pick-up means.

17. A duct section according to claim 15, in combination with electrical pick-up means engaging in the slot of the duct section, the pick-up means being shaped to progressively displace both the flat seals away from the associated duct section surfaces and the pick-up means moves along the slot and the pick-up means having further seals engaging with the duct section to maintain the sealing where the flat seals are displaced by the pick-up means.

18. In a duct section for the supply of pressure medium to a mobile appliance; said duct section containing said pressure medium and having a slot through which collector means for collecting the pressure medium gains access to the interior of the duct section and sealing means for sealing the slot; the improvement comprising the sealing means employs two flat seals, one of which engages on an interior surface of the duct section to cover the slot interiorly and the other of which engages on an exterior surface of the duct section to cover the slot exteriorly and the seals are displaced from their associated surfaces by the passage of the means for collecting the pressure medium.

19. An electrical supply system for supplying electricity to a mobile appliance said system comprising a plurality of longitudinally slotted duct sections arranged end-to-end and containing a common electrical conductor and pick-up means engaging in the slot of one of said duct-sections, for movement along the slots of the duct sections and making electrical contact with said conductor, wherein each duct section has two deformable flat strip seals engaging with the duct section in face-to-face contact with its interior and exterior surfaces to cover the slot therein and the pick-up means deflect the strip seals away from the duct section to permit its passage and is provided with further complementary seals slidably engaging with the duct section to maintain the sealing.

* * * * *